(12) United States Patent
Ueno (10) Patent No.: US 11,175,868 B2
(45) Date of Patent: Nov. 16, 2021

(54) ELECTRONIC DEVICE, PROGRAM, AND CONTROL METHOD OF ELECTRONIC DEVICE

(71) Applicant: SEIKO EPSON CORPORATION, Tokyo (JP)

(72) Inventor: Taichi Ueno, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/554,242

(22) Filed: Aug. 28, 2019

(65) Prior Publication Data

US 2020/0073602 A1 Mar. 5, 2020

(30) Foreign Application Priority Data

Aug. 28, 2018 (JP) .............................. JP2018-158987

(51) Int. Cl.
  *G06F 3/12* (2006.01)
  *H04N 1/00* (2006.01)
  *G06K 15/02* (2006.01)
  *H04W 52/02* (2009.01)

(52) U.S. Cl.
  CPC .......... *G06F 3/1221* (2013.01); *G06F 3/1229* (2013.01); *H04N 1/00896* (2013.01); *H04W 52/0216* (2013.01); *G06F 3/1292* (2013.01)

(58) Field of Classification Search
  None
  See application file for complete search history.

(56) References Cited

U.S. PATENT DOCUMENTS

| 2006/0068751 | A1* | 3/2006 | Chandra | H04W 52/0241 455/343.2 |
| 2008/0096580 | A1* | 4/2008 | Montemurro | H04L 12/66 455/456.1 |
| 2008/0198811 | A1* | 8/2008 | Deshpande | H04W 48/16 370/332 |
| 2009/0022068 | A1* | 1/2009 | Iyer | H04L 43/0811 370/254 |
| 2009/0111466 | A1* | 4/2009 | Montemurro | H04W 48/16 455/434 |
| 2010/0265885 | A1* | 10/2010 | Umeuchi | H04W 48/16 370/328 |
| 2012/0220248 | A1* | 8/2012 | Kanda | H04W 48/16 455/150.1 |

(Continued)

FOREIGN PATENT DOCUMENTS

| CN | 107920376 | * | 4/2018 | ............ H04W 36/08 |
| JP | 2013-131956 | | 7/2013 | |
| JP | 2018-158987 | | 10/2018 | |

OTHER PUBLICATIONS

B. H. Park, Y. M. Kwon, S. J. Bae and M. Y. Chung, "Implementation of connection management scheme of mobile stations in IEEE 802.11 WLAN APs considering transmission power control," IEEE 2013 Tencon—Spring, 2013, pp. 515-519, doi: 10.1109/TENCONSpring.2013.6584498. (Year: 2013).*

*Primary Examiner* — Beniyam Menberu
(74) *Attorney, Agent, or Firm* — Workman Nydegger (57) ABSTRACT

An electronic device which transitions to a power saving mode, when it is determined that a degree of change in the list of service set identifiers (SSIDs) acquired by scanning process is equal to or greater than a threshold value in normal mode is provided.

10 Claims, 7 Drawing Sheets

(56) References Cited

U.S. PATENT DOCUMENTS

| | | | |
|---|---|---|---|
| 2013/0114488 A1* | 5/2013 | Fang | H04W 52/0206 370/311 |
| 2013/0182272 A1* | 7/2013 | Lim | G06F 3/1221 358/1.13 |
| 2013/0223308 A1* | 8/2013 | Chandra | H04W 52/028 370/311 |
| 2013/0308512 A1* | 11/2013 | Jeong | H04W 52/0225 370/311 |
| 2014/0287773 A1* | 9/2014 | Agerstam | H04W 48/16 455/456.1 |
| 2015/0163846 A1* | 6/2015 | Weizman | H04W 52/0225 455/41.2 |
| 2015/0215890 A1* | 7/2015 | Nagatomo | H04W 64/00 455/456.1 |
| 2016/0219408 A1* | 7/2016 | Yang | H04W 52/0241 |
| 2016/0345269 A1* | 11/2016 | Basehore | H04W 4/027 |
| 2017/0041860 A1* | 2/2017 | Ogawa | H04W 48/16 |
| 2018/0376448 A1* | 12/2018 | Wild | H04W 84/22 |

\* cited by examiner

| LIST A | LIST B |
|---|---|
| "AAA" | "AAA" |
| null | "BBB" |
| null | "CCC" |
| null | "DDD" |
| null | "EEE" |
| null | "FFF" |
| null | "GGG" |
| null | "HHH" |

FIG. 5

| LIST A | LIST B |
|---|---|
| "AAA" | "AAA" |
| "BBB" | "BBB" |
| "CCC" | "CCC" |
| "DDD" | "DDD" |
| "EEE" | "000" |
| "FFF" | "FFF" |
| "GGG" | "GGG" |
| "HHH" | "HHH" |

FIG. 6

| LIST A | LIST B |
|--------|--------|
| "AAA"  | "BBB"  |
| null   | null   |
| null   | null   |
| null   | null   |
| null   | null   |
| null   | null   |
| null   | null   |
| null   | null   |

FIG. 7

| LIST A | LIST B |
|--------|--------|
| "AAA"  | "AAA"  |
| "BBB"  | "000"  |
| "CCC"  | "111"  |
| "DDD"  | "222"  |
| "EEE"  | "333"  |
| "FFF"  | "444"  |
| "GGG"  | "GGG"  |
| "HHH"  | "HHH"  |

FIG. 10

ELECTRONIC DEVICE, PROGRAM, AND CONTROL METHOD OF ELECTRONIC DEVICE

The present application is based on, and claims priority from JP Application Serial Number 2018-158987, filed Aug. 28, 2018, the disclosure of which is hereby incorporated by reference herein in its entirety.

BACKGROUND

1. Technical Field

The present disclosure relates to an electronic device, a program, and a control method of the electronic device.

2. Related Art

In the related art, a wireless local area network (LAN) is widely known as a wireless communication scheme. In the wireless LAN, a wireless communication device performs a scanning process of a service set identifier (SSID) and acquires SSID list information. In JP-A-2013-131956, a wireless communication device that acquires list information by preferentially performing the scanning process when a distance to an access point is apart is disclosed.

The scanning process is continuously performed in a short time and thus, the scanning process consumes a lot of power. A process other than the scanning process relating to other wireless communications also consumes considerable power. For that reason, a battery immediately runs out in a mobile device having a wireless communication function. Accordingly, it is required to reduce wasteful power consumption as much as possible and extend a battery life of the mobile device.

SUMMARY

An aspect of the present disclosure relates to an electronic device including a communication unit that acquires service set identifier (SSID) list information by a scanning process, and a processing unit that controls the communication unit, in which, when it is determined that a degree of change of the list information is equal to or greater than a threshold value, the processing unit performs at least one of a transition process to a power saving mode and a notification process for prompting transition to the power saving mode.

DESCRIPTION OF EXEMPLARY EMBODIMENTS

Hereinafter, this embodiment will be described. The embodiment described below does not unduly limit the contents of the present disclosure described in the appended claims. Further, not all of the configurations described in the embodiment are necessarily essential configuration requirements of the present disclosure.

1. System Configuration Example

In the related art, devices that perform wireless communication by a communication scheme according to a wireless LAN are widely known. Specifically, the wireless LAN is a wireless communication standard conforming to IEEE 802.11. In the following, Wi-Fi (registered trademark) will be described as a specific example of the wireless LAN.

A wireless communication device that performs communication conforming to the Wi-Fi standard performs a scanning process to wirelessly connect to an access point. The scanning process is a process of searching for the access point existing around the wireless communication device. More specifically, the scanning process is a process of receiving a beacon signal conforming to the Wi-Fi standard transmitted by the access point. Hereinafter, the beacon signal conforming to the Wi-Fi standard is referred to as a Wi-Fi beacon. The Wi-Fi beacon here is a beacon signal for broadcasting the SSID. The Wi-Fi beacon may include other information such as a media access control (MAC) address, channel information, and a beacon transmission interval of the access point.

As the wireless communication device, a device driven by a battery can be considered. The device driven by the battery is specifically a mobile device assumed to be carried by a user. As the mobile device is becoming more sophisticated, power consumption has increased compared to existing devices. For that reason, further power saving of the mobile device is required. Particularly, the scanning process is continuously executed and thus, power consumption is large. For that reason, in the mobile device, it is important to reduce power consumption due to the scanning process.

However, JP-A-2013-131956 intends to appropriately generate list information of SSIDs. In the method of the related art such as JP-A-2013-131956, power saving required for battery-powered mobile devices is not taken into consideration.

Figure 1:
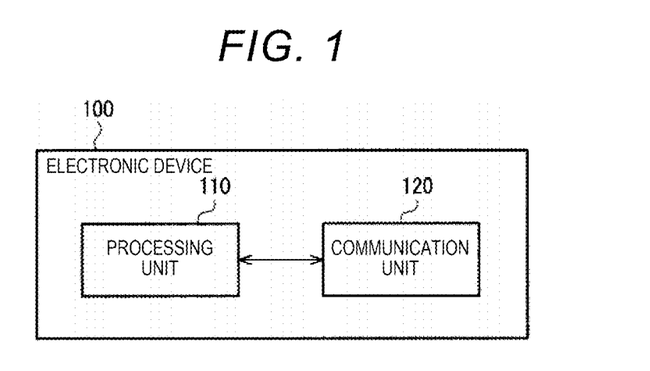
FIG. 1 is a diagram illustrating a configuration example of an electronic device.

An electronic device 100 according to this embodiment includes a communication unit 120 and a processing unit 110 as illustrated in FIG. 1. The communication unit 120 acquires list information of SSIDs by a scanning process. The processing unit 110 controls the communication unit 120. Specifically, the processing unit 110 is a processor or a controller. Specifically, the communication unit 120 is a communication interface or a communication device. Then, when it is determined that the degree of change in the list information is equal to or greater than a threshold value, the processing unit 110 performs at least one of a transition process to the power saving mode and a notification process for prompting transition to the power saving mode.

According to a method of this embodiment, when the degree of change of the list information is large, that is, when it is determined that the electronic device 100 is moving at least one of, the transition process to the power saving mode and the notification process for prompting transition to the power saving mode is performed. With this configuration, it is possible to realize appropriate power saving control according to a situation.

Figure 2:
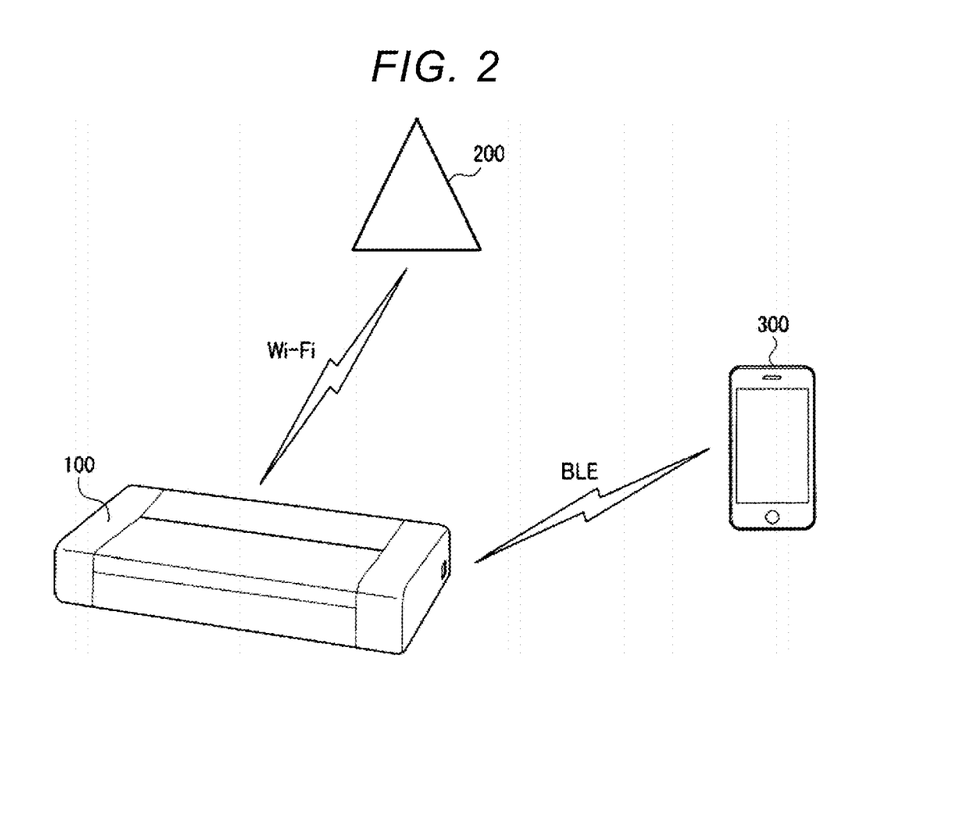
FIG. 2 is a diagram illustrating a configuration example of a system including the electronic device.

FIG. 2 illustrates an example of a system including the electronic device 100 according to this embodiment. The communication unit 120 of the electronic device 100 includes an antenna, and is configured to be able to communicate with a surrounding access point 200 through the antenna. Communication with the access point 200 is wireless communication conforming to the Wi-Fi standard. The communication unit 120 may communicate with a terminal device 300. Communication with the terminal device 300 can be realized by various wireless communication schemes, and is, for example, communication conforming to the Bluetooth (registered trademark) standard. Communication conforming to the Bluetooth standard may be, for example, communication conforming to Bluetooth Low Energy. Hereinafter, Bluetooth low energy is described as BLE.

Figure 3:
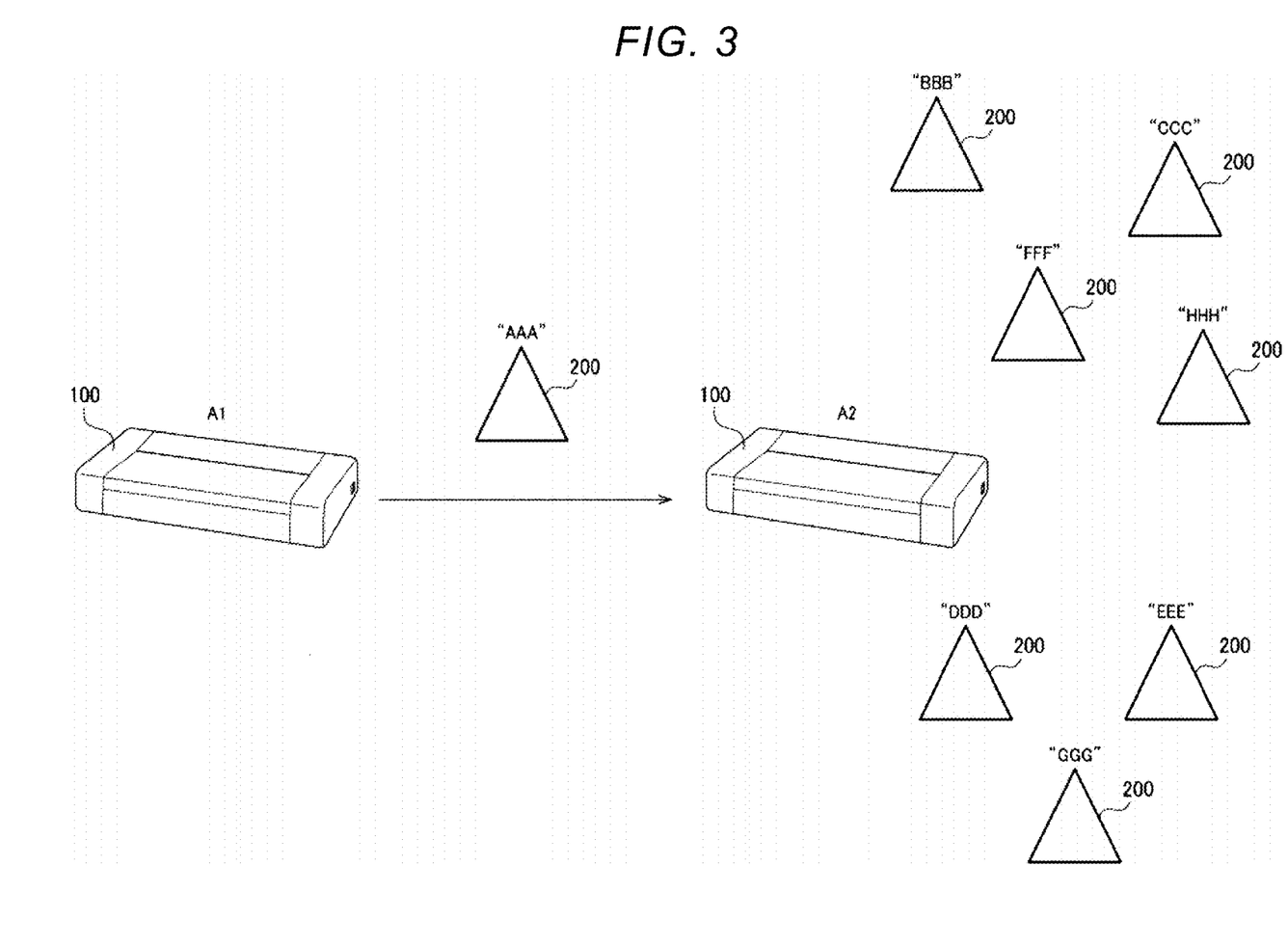
FIG. 3 is a diagram for illustrating a change in a positional relationship with an access point accompanying movement of the electronic device.
Figure 4:
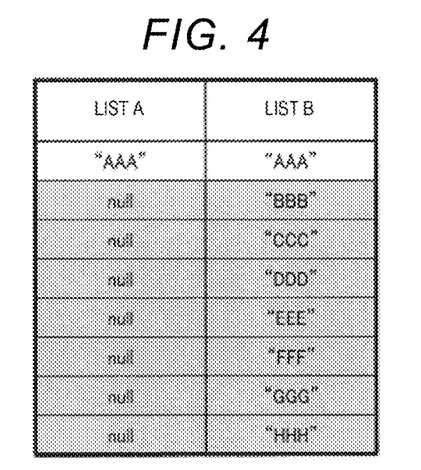
FIG. 4 is a table for explaining a degree of change of list information.

The list information of the SSIDs is information for managing the SSIDs acquired by the scanning process in a list format. The degree of change of the list information is information indicating how many the SSIDs included in the list information have changed over time. More specifically, the processing unit 110 obtains the degree of change of the list information based on a comparison process between the SSID included in first list information acquired at first timing and the SSID included in second list information acquired at second timing. The second timing is timing different from the first timing. In a narrow sense, the first timing corresponds to execution timing of a given scanning process, and the second timing is timing at which the scanning process is executed next to the first timing. In the example of FIG. 3 and FIG. 4 described later, the first timing is the timing when the electronic device 100 executes the scanning process at a position indicated by A1, and the first list information corresponds to a list A. The second timing is the timing at which the electronic device 100 executes the scanning process at a position indicated by A2, and the second list information corresponds to a list B.

The access point 200 is a device assumed to be fixed at a given position. It is not assumed that a reachable range of the Wi-Fi beacon transmitted from the access point 200 changes significantly. If the electronic device 100 is not moving, the Wi-Fi beacon receivable by the electronic device 100 does not change significantly, and the degree of change of the list information is small. The moving here indicates that the electronic device 100 is transported by the user.

On the other hand, when the Wi-Fi beacon from a given access point 200 which has been received up to that point cannot be received, it is considered that a positional relationship between the electronic device 100 and the access point 200 has largely changed. The same applies to a case where the Wi-Fi beacon from the given access point 200 that has not been received can be received. That is, when the degree of change of the list information is large, it is considered that the electronic device 100 is moving.

It is assumed that a portable terminal device such as a smartphone is used even while moving. For that reason, if power saving control is performed when the degree of change of the list information is large, an operation of the portable terminal device may be disturbed. For example, when the portable terminal device transitions to the power saving mode in which the execution interval of the scanning process is increased, the time until connecting to the access point 200 is increased. However, among the electronic devices 100, many devices which are not assumed to be used during movement can be considered. In such an electronic device 100, since power saving control can be executed for a period when the user does not use the electronic device by applying the method of this embodiment, a demerit due to the power saving control can be suppressed.

For example, the electronic device 100 according to this embodiment includes a print unit that prints an image on a print medium. That is, the electronic device 100 is a printer, and in a narrow sense, is assumed to be carried by the user and is a battery-powered mobile printer. The print unit includes a print engine. The print engine is a mechanical configuration that performs printing of an image on the print medium. The print engine includes, for example, a transport mechanism, a discharge head of an inkjet type, and a drive mechanism of a carriage including the discharge head. The print engine prints an image on the print medium by discharging ink from the discharge head to the print medium transported by the transport mechanism. As the print medium, various media such as paper and cloth can be used. The specific configurations of the print unit and the print engine are not limited to those illustrated here, and various modifications can be made thereto.

Alternatively, the electronic device 100 according to this embodiment includes an image reading unit that reads an image by an image sensor. That is, the electronic device 100 may be a scanner, or in a narrow sense, a mobile scanner. The image reading unit includes a light source and an image sensor. The light source is configured by, for example, alight emitting diode (LED) or a fluorescent lamp. The image sensor receives light that is emitted from the light source and reflected by a reading target such as an document, converts the received light into an electric signal, and outputs a pixel signal having a value corresponding to an amount of light received. The image sensor is, for example, a linear image sensor. The specific configuration of the image reading unit is not limited to the one exemplified here, and various modifications can be made thereto.

The mobile printer and mobile scanner are portable devices and are not assumed to be used on the move. This is because it is necessary to set the print medium and the document in order to execute printing and scanning and it is desirable to install the device in a stable place in order to smoothly transport the print medium and the like. That is, it is assumed that these electronic devices 100 are used at a destination after the movement to the destination is completed. Accordingly, by performing power saving control when it is determined that the user is moving, power consumption can be reduced without impairing convenience of the user.

The electronic device 100 according to this embodiment can be extended to other devices that are carried and not assumed to be used during movement. For example, the electronic device 100 may be a projector including an image projection unit, and may be a mobile projector in a narrow sense. The electronic device 100 is not prevented from being a mobile multifunction peripheral (MFP) having a plurality of functions.

The processing unit 110 of this embodiment is configured by the following hardware. The hardware can include at least one of a circuit that processes digital signals and a circuit that processes analog signals. For example, the hardware can be configured by one or more circuit elements or one or more circuit devices mounted on a circuit board. The one or more circuit devices are, for example, an IC or the like. The one or more circuit elements are, for example, a resistor, a capacitor and the like.

The processing unit 110 may also be realized by the following processor. The electronic device 100 according to this embodiment includes a memory that stores information and a processor that operates based on information stored in the memory. The information is, for example, a program and various data. The processor includes hardware. As the processor, various processors such as a central processing unit (CPU), a graphics processing unit (GPU), and a digital signal processor (DSP) can be used. The memory may be a semiconductor memory such as a static random access memory (SRAM) or a dynamic random access memory (DRAM), may be a register, or may be a magnetic storage device such as a hard disk drive, or an optical storage device such as an optical disk device. For example, the memory stores an instruction readable by a computer, and the instruction is executed by the processor to implement a function of each unit of the electronic device 100 as a process. The instruction here may be an instruction of an instruction set that configures a program, or an instruction that instructs a hardware circuit of the processor to operate.

2. Change Degree of List Information and Power Saving Mode

Next, a process of this embodiment will be described in detail. First, an example of list information of SSIDs and a method of determining the degree of change of the list information will be described. Thereafter, an example of the transition process to the power saving mode and an example of the notification process for prompting transition to the power saving mode will be respectively described.

2.1 Change in List Information with Movement of Electronic Device

FIG. 3 is a schematic view illustrating a positional relationship between the movement of the electronic device 100 and the access point 200 around the electronic device 100. Consider a case where the electronic device 100 moves from the position illustrated in A1 to the position illustrated in A2 by being transported by the user.

In a state where the electronic device 100 is at the position of A1, the electronic device 100 has a short distance to the access point 200 whose SSID is "AAA", and can receive a Wi-Fi beacon from the access point 200. The electronic device 100 has a long distance to the seven access points 200 whose SSID is "BBB" to "HHH", and cannot receive Wi-Fi beacons from the seven access points 200. For that reason, the electronic device 100 performs the scanning process in A1 to acquire list information illustrated in a list A of FIG. 4. As illustrated in FIG. 4, the list A is list information including one SSID of "AAA". The null in FIG. 4 means that the SSID has not been found.

When the electronic device 100 moves to the position A2, the electronic device 100 is close to eight access points 200 whose SSIDs are "AAA" to "HHH", and can receive Wi-Fi beacons from the eight access points 200. For that reason, the electronic device 100 performs the scanning process in A2 to acquire list information illustrated in a list B of FIG. 4. As illustrated in FIG. 4, the list B is list information including eight SSIDs of "AAA" to "HHH".

As can be seen from FIGS. 3 and 4, when the electronic device 100 moves, the SSIDs included in the list information change significantly. Accordingly, in this embodiment, the processing unit 110 determines whether or not the electronic device 100 is moving based on the degree of change of the list information. Specifically, when it is determined that the degree of change in the list information is equal to or greater than a given threshold value, the processing unit 110 determines that the electronic device 100 is moving.

The degree of change of the list information is obtained, for example, as follows. The degree of change of the list information is, for example, a rate of change of the SSIDs included in the list information. The processing unit 110 sets the number of SSIDs changing in the list A and the list B as X. In the example of FIG. 4, since the second to eighth SSIDs of the list change from null to "BBB" to "HHH", respectively, X=7. The processing unit 110 sets Y, which is the larger of the number of SSIDs included in the list A and the number of SSIDs included in the list B. In the example of FIG. 4, Y=8.

The change degree of the SSIDs can be obtained, for example, by X/Y. When (X/Y)≥Th is satisfied, the processing unit 110 determines that the degree of change of the list information is equal to or greater than the threshold value and the electronic device 100 is moving. The Th is a threshold value is set in advance, for example, a value of about 0.5. A specific numerical value of the threshold value Th can be variously modified. In the example of FIG. 4, since (7/8)>0.5, the processing unit 110 determines that the change degree of the list information is equal to or greater than the threshold value.

Figure 5:
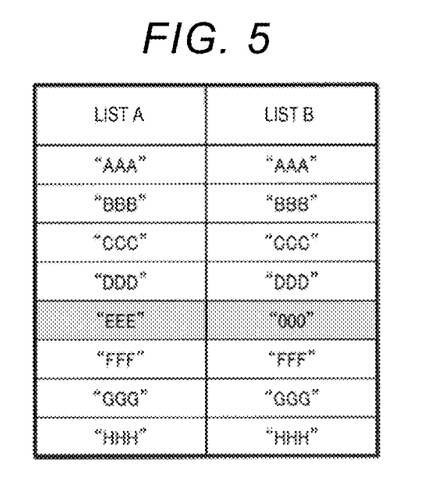
FIG. 5 is a table for explaining the degree of change of list information.
Figure 6:
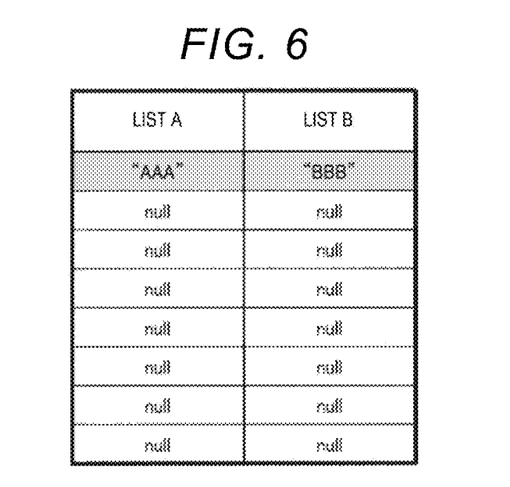
FIG. 6 is a table for explaining the degree of change of list information.
Figure 7:
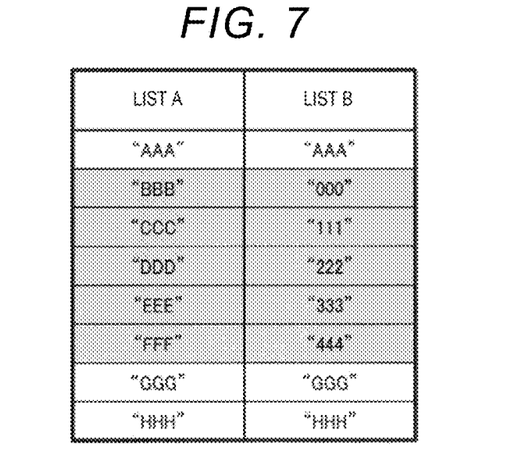
FIG. 7 is a table for explaining the degree of change of list information.

FIGS. 5 to 7 illustrate specific examples for explaining the change of the list information. In each of FIGS. 5 to 7, the list A is list information acquired at a given timing, and the list B is list information acquired at a timing different from that of the list A. In a narrow sense, the lists A and B are two pieces of list information acquired by two consecutive scanning processes. In the example of FIG. 5, the fifth SSID of the list changes from "EEE" to "OOO", and the others are common. That is, since X=1 and Y=8, and (X/Y)≥Th is not satisfied, the processing unit 110 determines that the change degree of the list information is less than the threshold value.

In the example of FIG. 6, only one SSID is searched, and the SSID changes from "AAA" to "BBB". That is, since X=1 and Y=1, and (X/Y)≥Th is satisfied, the processing unit 110 determines that the change degree of the list information is equal to or greater than the threshold value.

In the example of FIG. 7, eight SSIDs are respectively searched, and the second to sixth SSIDs in the list are changed from "BBB" to "FFF" to "OOO" to "444", respectively. That is, since X=5 and Y=8, and (X/Y)≥Th is satisfied, the processing unit 110 determines that the change degree of the list information is equal to or greater than the threshold value.

However, various modifications can be made to the method of determining the degree of change. For example, the processing unit 110 may set the number of SSIDs included in only one of the list A and the list B as X', set the total number of SSIDs included in the list A and the list B, excluding the duplication, as Y', and set X'/Y' as the degree of change.

In the example of FIG. 4, since X'=7 and Y'=8, the same as the example described above. In the example of FIG. 5, since "EEE" and "OOO" are SSIDs included in only one of the lists A and B, respectively, X'=2. Since the SSIDs included in the list A and the list B are "AAA" to "HHH" and "OOO", Y'=9. That is, the degree of change in this case is (X'/Y')=2/9. Similarly, in the case of FIG. 6, X'=2 and Y'=2. In the case of FIG. 7, X'=10 and Y'=13. When (X'/Y')>Th is satisfied, the processing unit 110 determines that the degree of change of the list information is equal to or greater than the threshold value.

The processing unit 110 only needs to be able to determine whether or not the degree of change is equal to or greater than the threshold value, and the specific process is not limited to the example described above. For example, the processing unit 110 may set the number of matching SSIDs in the list A and the list B as Z, and determine the degree of change based on Z/Y. Here, Z is Z=Y−X. For example, when (Z/Y)<Th is satisfied, the processing unit 110 determines that the change degree of the list information is equal to or greater than the threshold value. The number Z of matching SSIDs in the list A and the list B also satisfies Z=Y'−X'. Accordingly, when (Z/Y')<Th is satisfied, the processing unit 110 may determine that the change degree of the list information is equal to or greater than the threshold value.

In a broad sense, the processing unit 110 may determine the degree of change based on an evaluation function E(X, Y, Z). The evaluation function E is, for example, an arbitrary function which becomes larger as X is larger, becomes smaller as Y is larger, and becomes smaller as Z is larger. The processing unit 110 sets a given threshold value Th2 in advance, and determines that the change degree of the list information is equal to or greater than the threshold value when E≥Th2 is satisfied. The Th2 is a value corresponding to the form of the evaluation function E, and may be, for example, the same as the Th described above.

In the evaluation function E, any one of X, Y, and Z may be omitted. When Z is omitted, the evaluation function E is, for example, E=X/Y described above. Also, E(X', Y', Z) may be used as the evaluation function. The evaluation function E is not limited to a function for obtaining a ratio, and may be, for example, of the form E(X, Z)=X−Z. In the evaluation function described above, both Y and Z may be omitted, and the evaluation function may be a function E(X) of X or a function E (X') of X'. Alternatively, both X and Y may be omitted, and the evaluation function may be a function E(Z) of Z.

In the matters described as above, the example which obtains the degree of change of list information was described by comparing two pieces of list information acquired at two different timing. However, the number of pieces of the list information used to determine the degree of change may be expanded to three or more. For example, in three or more pieces of list information, the processing unit 110 sets the number of SSIDs changing in at least one list information as X. The processing unit 110 sets the maximum value among the number of SSIDs included in each list information to Y. Processing after X and Y are obtained is the same as in the case where the number of pieces of list information is two. The matters that various modifications can be made to the process of obtaining the degree of change are same as in the case where three or more pieces of list information are targeted.

2.2 Transition Process to Power Saving Mode

Figure 8:
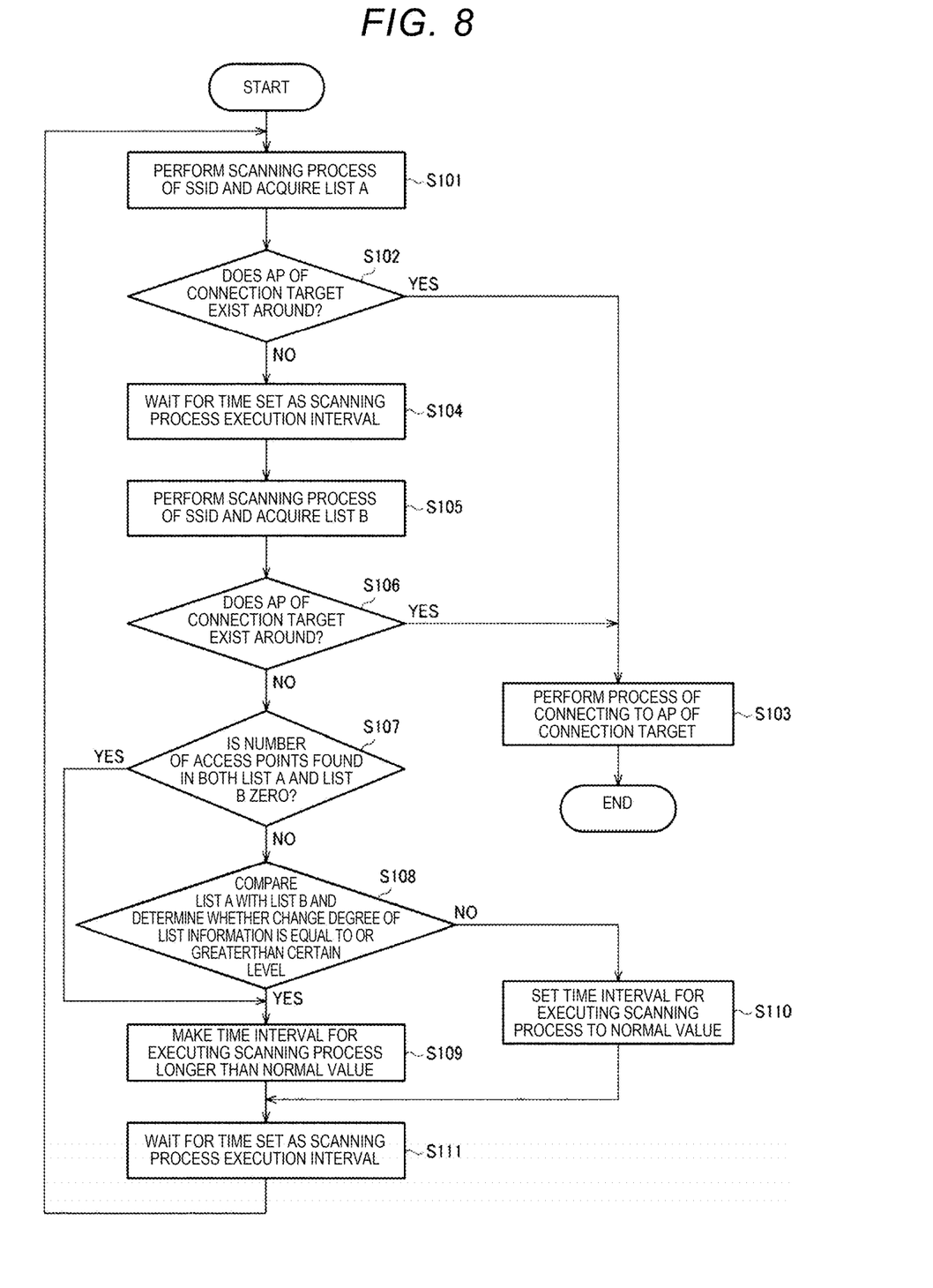
FIG. 8 is a flowchart illustrating a transition process to a power saving mode.

FIG. 8 is a flowchart for explaining a process when performing the transition process to the power saving mode based on the degree of change of the list information. FIG. 8 is a flowchart specifically describing control of Wi-Fi connection in the electronic device 100. The access point 200 is denoted as AP in the drawings for simplification.

When this process is started, the processing unit 110 controls the communication unit 120 to perform the scanning process of the SSID and acquires list information (S101). The list information acquired in S101 is referred to as the list A. The processing unit 110 determines whether or not an access point 200 set as a connection target around the electronic device 100 (S102) exists. The access point 200 set as the connection target is, for example, the access point 200 having a history of connection in the past. A process in S102 is a process of determining whether the list A includes an SSID having the connection history. When the access point 200 set as the connection target exists around (Yes in S102), the processing unit 110 performs a process of connecting to the access point 200 (S103), and ends the process.

When it is determined that the access point 200 set as the connection target does not exist around (No in S102), the processing unit 110 waits for the time set as a scanning process execution interval (S104). After waiting, the processing unit 110 controls the communication unit 120 again to perform the scanning process of the SSID, and acquires the list information (S105). The list information acquired in S105 is referred to as the list B. The processing unit 110 determines whether or not the access point 200 set as the connection target exists around the electronic device 100 (S106). When it is determined that the access point 200 exists (Yes in S106), the processing unit 110 performs a process of connecting to the access point 200 (S103).

Also here, when the access point 200 set as the connection target does not exist around (No in S106), the processing unit 110 determines whether or not to transition to the power saving mode. First, the processing unit 110 determines whether or not the number of access points 200 found in both the list A and the list B is 0, that is, whether the number of SSIDs included in the lists is 0 (S107).

When it is determined that at least one access point 200 is found (No in S107), the processing unit 110 compares the list A with the list B, and determines whether or not the change degree of the list information is equal to or greater than a threshold value (S108). A specific determination process is as described above.

When it is determined that the degree of change in the list information is equal to or greater than the threshold value (Yes in S108), or when it is determined that the number of SSIDs included in the list information is 0 continuously (Yes in S107), the processing unit 110 performs the transition process to the power saving mode (S109). The matters that the degree of change in the list information is equal to or greater than the threshold correspond to a situation in which the electronic device 100 is moving as described above and use of the electronic device 100 by the user is not assumed. According to the method of this embodiment, it is possible to appropriately reduce power consumption without impairing the convenience of the user.

The matters that the number of SSIDs included in the list information is continuously 0 correspond to a situation in which both the number of SSIDs included in the first list information and the number of SSIDs included in the second list information are 0. In this case, it is considered that the access point 200 does not exist around the electronic device 100. When the number of SSIDs included in the list information is continuously 0, since the advantage of performing the scanning process is small, for example, as described later, by performing the transition process to the power saving mode in which the Wi-Fi function is limited, power consumption can be efficiently reduced. However, when the number of SSIDs included in the list information is 0 continuously, the processing unit 110 may transition to another power saving mode. This is because the mobile device assumed as the electronic device 100 according to this embodiment is highly likely to receive information used for operation from the outside or transmit information generated by the operation to the outside. For example, when the electronic device is a mobile printer, print data is received from a portable terminal device or the like. If it is a mobile scanner, image data acquired by the scanning process is transmitted to a terminal device such as a PC. The device such as the mobile printer often has simplified functions such as a display unit, an operation unit, and a storage unit, and this is because the device such as the mobile printer is effective in performing data creation, storage, browsing, and the like in cooperation with an external device. That is, when communication with the external device is difficult, the probability that the electronic device 100 according to this embodiment operates positively is low, and a problem does not easily occur even when the electronic device transitions to the power saving mode. The power saving mode is not limited to an operation mode that limits the Wi-Fi function. That is, according to the method of this embodiment, when the need to actively consume power is low, it is possible to appropriately transition to the power saving mode.

When performing the transition process, the processing unit 110 performs a process of making the time interval for executing the scanning process longer than a given value. The electronic device 100 according to this embodiment operates in either the power saving mode or the normal operation mode. The power saving mode is a mode in which power consumption is relatively small, and the normal operation mode is a mode in which power consumption is relatively large. The normal operation mode is, in a narrow sense, a mode in which the electronic device 100 is in an operating state, corresponds to a mode in which a printing operation is performed if the electronic device 100 is the mobile printer, and corresponds to a mode in which an image reading operation is performed if the electronic device 100 is the mobile scanner. The power saving mode may include a plurality of modes with different power consumption. Alternatively, the normal operation mode may include a plurality of modes with different power consumption. The given value here is the execution interval of the scanning process in the normal operation mode, and in the power saving mode, the time interval for executing the scan process is longer than that in the normal operation mode. In this way, frequency of execution of the scanning process in the power saving mode is reduced and thus, it is possible to appropriately reduce power consumption. For example, the time interval in the normal operation mode is about several seconds, and the time interval when the transition process to the power saving mode is performed is about ten seconds to several tens of seconds. However, a specific time intervals may be variously modified.

When it is determined that the degree of change in the list information is less than the threshold value and the number of SSIDs included in the list information is not continuously 0, the processing unit 110 performs a process for setting the normal operation mode. That is, when it is determined that the determination result in S107 is No and when it is determined that the determination result in S108 is also No, the processing unit 110 performs a process of setting the time interval for executing the scanning process to a normal value (S110). In this way, it is possible to appropriately switch between the power saving mode and the normal operation mode. The matters that the number of SSIDs included in the list information is not continuously 0 corresponds to situation where at least one of the number of SSIDs included in the list A and the number of SSIDs included in the list B is not zero.

After the process of S109 or S110, the processing unit 110 waits for a set time interval of the scanning process (S111), and after waiting, returns to S101 to execute the scanning process.

In FIG. 8, an example in which the process returns to S101 after S111 is described. In this case, since acquisition of the list A and acquisition of the list B are performed again, it is determined whether or not the transition process to the power saving mode is to be performed once for two scanning processes. However, the process of this embodiment is not limited thereto, and may return to S104 after S111. In this case, the process of S107 and subsequent steps is performed by setting list information acquired in the previous process of S104 as the list A and setting the list information acquired in the latest process of S104 as the list B. In other words, it may be determined whether or not to perform the transition process to the power saving mode once for one scanning process.

2.3 Notification Process for Prompting Transition to Power Saving Mode

Figure 9:
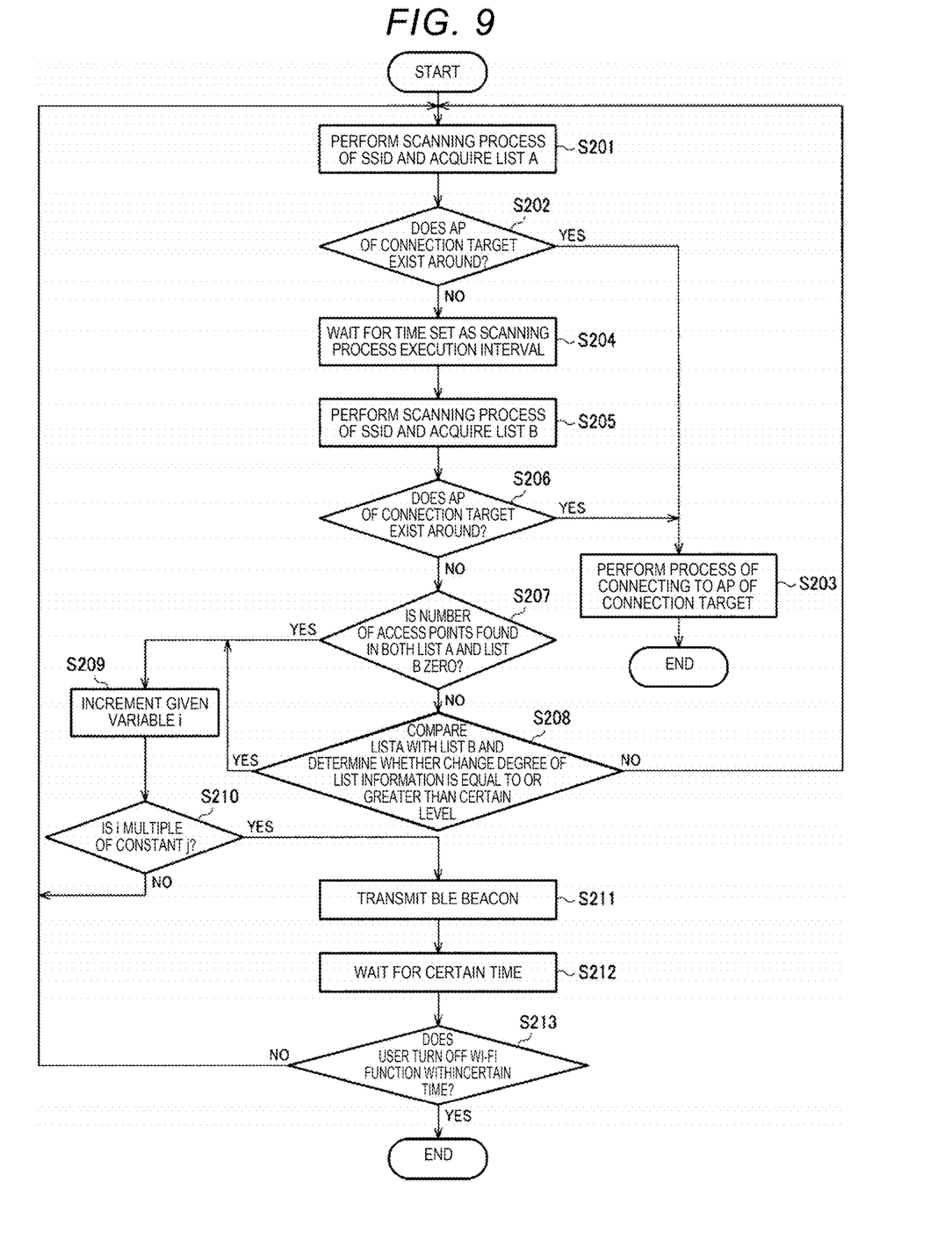
FIG. 9 is a flowchart illustrating a notification process for prompting transition to the power saving mode.

FIG. 9 is a flowchart for describing a process when performing notification process for prompting transition to the power saving mode based on the degree of change of the list information. The process of S201 to S208 in FIG. 9 is the same as that of S101 to S108, and thus detailed description thereof will be omitted.

When it is determined that the degree of change in the list information is equal to or greater than the threshold value (Yes in S208) or when it is determined that the number of SSIDs included in the list information is 0 continuously (Yes in S207), the processing unit 110 performs the notification process for prompting transition to the power saving mode. In this way, when the electronic device 100 is moving and is not assumed to be used, or when the access point 200 does not exist around and there is little advantage in performing the scanning process, it is possible to appropriately prompt transition to the power saving mode.

When it is determined that the change degree of the list information is less than the threshold value and when the number of SSIDs included in the list information is not continuously 0, the processing unit 110 performs a process for setting the normal operation mode. That is, when it is determined that the determination result in S207 is No and when it is determined that the determination result in S208 is also No, the processing unit 110 returns to S201 without performing the notification process.

The communication unit 120 of the electronic device 100 performs communication according to a first wireless communication scheme used for scanning process and communication according to a second wireless communication scheme different from the first wireless communication scheme. The first wireless communication scheme is a communication scheme based on a wireless LAN, and in a narrow sense, a communication scheme based on the Wi-Fi standard. The second wireless communication scheme is a communication scheme conforming to the BLE standard in a narrow sense. Then, when performing the notification process, the processing unit 110 performs a process of causing the communication unit 120 to transmit a beacon signal conforming to the second wireless communication scheme including information for prompting transition to the power saving mode.

In this way, it is possible to transmit the beacon signal to devices around the electronic device 100 using a wireless communication scheme different from the first wireless communication scheme. Since the electronic device 100 is attempting to establish a connection with the access point 200 by the scanning process, it is difficult to transmit information to peripheral devices using the first wireless communication scheme. The second wireless communication scheme different from the first wireless communication scheme is used to thereby make it possible to increase the probability that information transmitted by the electronic device 100 is received by the peripheral devices.

There is a high probability that the terminal device 300 used by the user exists around the electronic device 100. The user here is a user of the terminal device 300 and a user of the electronic device 100. The terminal device 300 is, for example, a portable terminal device such as a smartphone, and may be another device. A signal is transmitted in a manner that can be received by the terminal device 300 to thereby make it possible to prompt the user to perform a transition operation of the electronic device 100 to the power saving mode. In particular, the beacon signal is used to thereby make it possible to appropriately transmit information to the terminal device 300 even when the connection by the second wireless communication scheme is not established between the electronic device 100 and the terminal device 300. For example, in an advertise packet which is a beacon signal conforming to BLE, there is an area where the user can set any information, and thus, information can be transmitted from the electronic device 100 to the terminal device 300 using the region.

The beacon signal conforming to the second wireless communication scheme includes information indicating that the electronic device 100 is moving, or information indicating that the access point 200 does not exist around the electronic device 100. Here, the term "around" is a region based on a distance in which the electronic device 100 can receive the Wi-Fi beacon. However, the processing unit 110 of the electronic device 100 may execute the scanning process based on the Wi-Fi beacon received by the communication unit 120, and does not perform the process by setting a strict range as the "around the electronic device 100". The information indicating that the electronic device 100 is moving or the information indicating that the access point 200 does not exist around the electronic device 100 may be any information as long as the information can be recognized in the terminal device 300, may be text information, may be information including a specific data pattern set in advance, or may be other types of information. In this way, since the terminal device 300 can recognize that the electronic device 100 is in a state to transition to the power saving mode, the terminal device 300 can appropriately notify the user.

When it is determined that the degree of change in the list information is equal to or greater than the threshold value, or when the number of SSIDs included in the list information is 0 continuously, the electronic device 100 is not prevented from performing notification process for prompting transition to the power saving mode every time. However, since the scanning process in the normal operation mode is performed at intervals of several seconds, if the notification process is always performed in the case of Yes in S207 or S208, the notification is frequently performed, which may be troublesome for the user.

Accordingly, when it is determined that the number of occurrences or the occurrence time of an event in which it is determined that the degree of change of the list information is equal to or greater than the threshold value or an event in which the number of SSIDs included in the list information is continuously 0 satisfies a given condition, the processing unit 110 causes the communication unit 120 to transmit the beacon signal conforming to the second wireless communication scheme. In this way, it is possible to suppress execution frequency of the notification process and to improve the convenience of the user. The event in which the number of SSIDs included in the list information is continuously 0 is an event in which both the number of SSIDs included in the first list information and the number of SSIDs included in the second list information are 0.

For example, when it is determined that the degree of change in the list information is equal to or greater than the threshold value (Yes in S208), or when the number of SSIDs included in the list information is 0 continuously (Yes in S207), the processing unit 110 increments a given variable i (S209). Then, the processing unit 110 determines whether or not i is a multiple of a constant j (S210).

When it is determined that i is a multiple of j (Yes in S210), the processing unit 110 causes the communication unit 120 to transmit the beacon signal conforming to the second wireless communication scheme (S211). When it is determined that i is not a multiple of j (No in S210), the processing unit 110 returns to S201 without performing the notification process. Here, j is a given integer. In this case, since the notification process is performed only once for j occurrences of the event, it is possible to suppress the execution frequency of the notification process.

Although i is a variable indicating the number of occurrences here, for example, i may be a time during which an event continues to occur. For example, when an event occurs twice successively, the processing unit 110 performs a process of increasing a value of i for the time corresponding to an interval between the first event detection timing and the second event detection timing. In this case, since i is not necessarily a multiple of j, for example, the processing unit 110 may return to S201 without performing the notification process when i<j, and may perform a process for initializing i to 0 while performing the notification process when i≥j.

After the notification process of S211, the processing unit 110 waits for a given wait time to receive a transition instruction from the user (S212). Then, when an instruction to transition to the power saving mode is received within the given wait time after transmitting the beacon signal, the processing unit 110 performs a process for turning off the communication operation of the communication unit 120 according to the first wireless communication scheme (S213), and ends the process. In this way, it is possible to appropriately transition to the power saving mode when the transition instruction based on the notification process is received, and to use the mode in which the communication according to the first wireless communication scheme is turned off as the power saving mode. When the notification process is performed, the instruction to transition to the power saving mode is an instruction based on the user's operation and thus, there is little possibility that the convenience of the user is impaired even if the mode is transitioned to a mode with smaller power consumption. Accordingly, here, the processing unit 110 performs control to turn off the Wi-Fi communication itself, instead of lengthening the time interval of execution of the scanning process. However, the processing unit 110 does not prevent the transition process to the power saving mode in which the time interval of the execution of the scanning process is lengthened based on the transition instruction.

When it is determined that the instruction to transition to the power saving mode is not received within the given wait time (No in S213), the processing unit 110 returns to S201 and continues the process without transitioning to the power saving mode.

Figure 10:
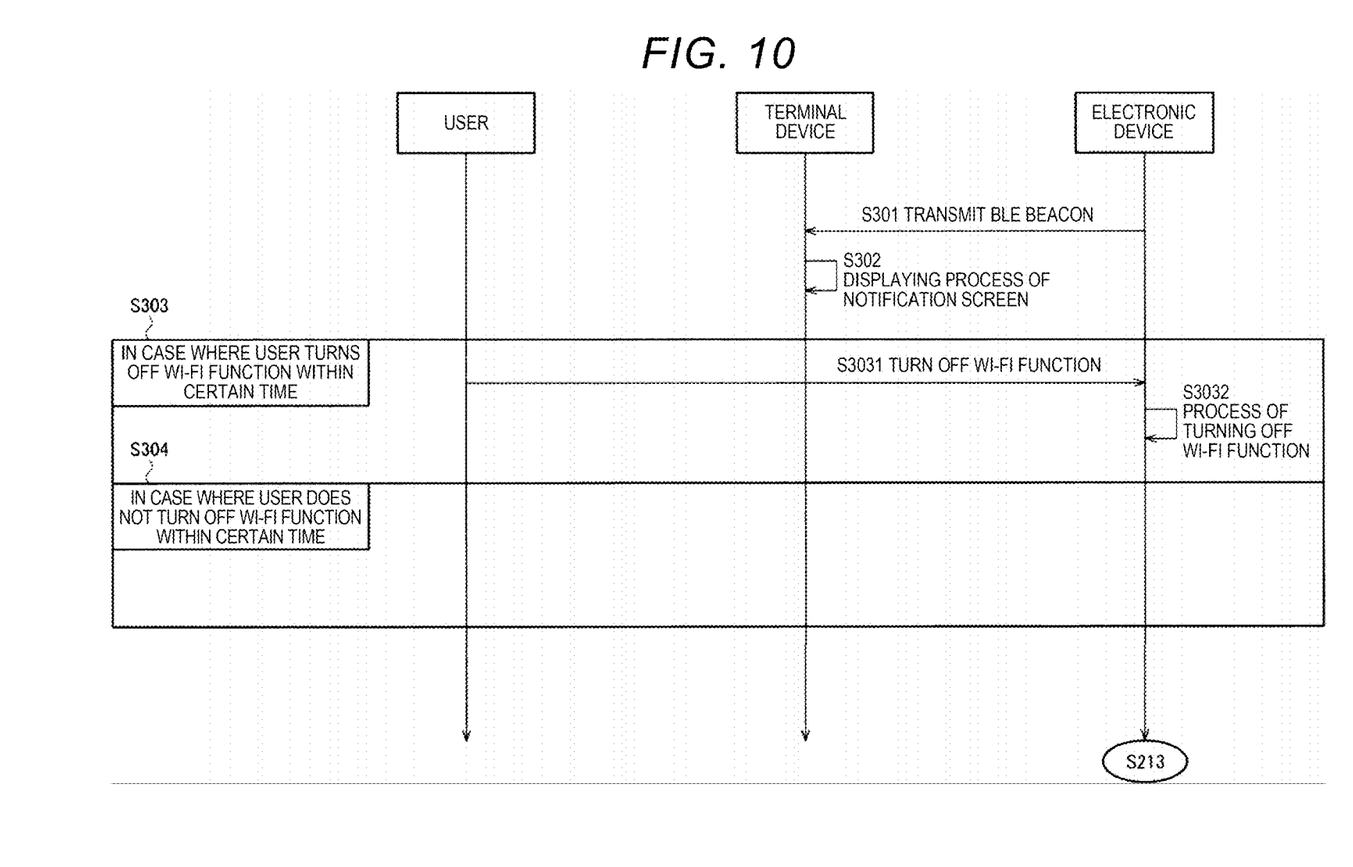
FIG. 10 is a sequence diagram for explaining a detailed sequence of the notification process.

FIG. 10 is a sequence diagram for explaining the details of the processes of S211 and S212. First, the processing unit 110 of the electronic device 100 transmits the beacon signal conforming to the BLE standard (S301). The process of S301 corresponds to S211. The terminal device 300 that has received the beacon signal performs the notification process for the user (S302). For example, the terminal device 300 displays, on its own display unit, text information that "Currently, the access point does not exist around the printer, or the printer is moving." The terminal device 300 may display text information for prompting transition to the power saving mode) directly, such as "It is recommended to turn off the Wi-Fi function of the printer for power saving". The notification information in S302 is not limited to the display of text, but may be a process of displaying an icon or an image, may be generation of sound by a speaker, or may be light emission of a light emitting unit such as an LED.

The process when the user's operation is performed within a given wait time is S303. Specifically, the user performs an operation on the electronic device 100 based on the notification in S302 (S3031). The processing unit 110 of the electronic device 100 performs control to turn off the Wi-Fi function based on the user's operation (S3032).

The user operation in step S3031 is, for example, an operation of the operation unit of the electronic device 100. The user's operation may be an operation of directly instructing to turn off the Wi-Fi function, such as pressing an on/off button of the Wi-Fi function. Alternatively, the user's operation may be an operation to instruct transition to the power saving mode, and the processing unit 110 may perform a process for determining contents of the specific power saving mode based on the operation. The user's operation may be an operation of the operation unit of the terminal device 300. In this case, the terminal device 300 transmits information for instructing transition to the power saving mode to the communication unit 120 of the electronic device 100 based on the user's operation. Communication at this time is assumed to use the second wireless communication scheme. The terminal device 300 may transmit an instruction to transition to the power saving mode using the beacon signal of BLE. Alternatively, the terminal device 300 may respond to the beacon signal received in S301 to establish a BLE connection, and transmit the instruction to transition to the power saving mode using the established connection. The instruction to transition to the power saving mode from the terminal device 300 to the electronic device 100 does not prevent the use of the third wireless communication scheme different from any of the first wireless communication scheme and the second wireless communication scheme.

The process when no operation by the user is performed within the given wait time is S304. In this case, no user operation is performed, and the electronic device 100 and the terminal device 300 do not particularly execute a process. After the processes of S303 or S304, the processing unit 110 of the electronic device 100 performs the process illustrated in S213 of FIG. 9. When the process of S303 is performed, the processing unit 110 determines that the determination result in S213 is Yes, and ends the process. When the process of S304 is performed, the processing unit 110 determines that the determination result in S213 is No, returns to S201 and continues the process.

3. Modification Example

Hereinafter, some modification examples will be described.

3.1 Modification Example of Power Saving Mode

In the description described above, as the power saving mode of the electronic device 100, the mode in which the time interval for executing the scanning process is longer than the normal operation mode and the mode in which the Wi-Fi function is turned off have been described. However, the power saving mode of this embodiment is not limited thereto.

For example, when performing the transition process to the power saving mode, the processing unit 110 may perform a display off process of turning off the display unit of the electronic device 100. The display unit of the electronic device 100 is various displays such as a liquid crystal display (LCD) for displaying various information to the user, and an organic light emitting diode (OLED) display. The display unit may be configured to be integrated with an operation unit as, for example, a touch panel. These displays need to emit light from the light emitting unit and the like, and consume a large amount of power. In the situation where the access point 200 is moving or does not exist in the vicinity, it is considered that there is not much information to be displayed on the display unit. Accordingly, power consumption can be appropriately reduced by performing the display off process as the transition process to the power saving mode. As the notification process for prompting transition to the power saving mode, a notification for prompting the display off process may be performed.

Alternatively, when performing the transition process to the power saving mode, the processing unit 110 may perform a frequency reduction process for reducing a frequency of an operation clock. The operation clock here is an operation clock of a processor which is the processing unit 110, for example. That is, the processing unit 110 performs a process of lowering its own operation clock compared to the frequency in the normal operation mode as the transition process to the power saving mode. Also in this case, it is possible to appropriately reduce power consumption.

The frequency reduction process here may include a process of stopping the operation of some processors. For example, when the processing unit 110 includes a plurality of processors such as a main CPU and a sub-CPU, the processing unit 110 executes the process of stopping some of the CPUs as the frequency reduction process.

Alternatively, when performing the transition process to the power saving mode, the processing unit 110 may perform a radio wave stop process for stopping transmission of radio waves in a predetermined frequency band. Here, the predetermined frequency band is, for example, a frequency band which is prohibited by law to be used outdoors, and specifically, is a 5.3 GHz band or the like.

According to the method of this embodiment, the determination that the degree of change in the list information is equal to or greater than the threshold value may be a trigger for a transition process to the power saving mode and a notification process for prompting transition to the power saving mode, and the power saving mode is not limited to one described above and can be realized by various aspects.

The trigger for the transition process to the power saving mode and the notification process for prompting transition to the power saving mode is not limited to one described above. For example, the trigger may be, for example, an event that the user's operation has not been performed for a predetermined time or more, the time specified in advance being reached, or a predetermined error has occurred. Then, it is possible to combine these triggers, and although the transition process or notification process is performed in accordance with the occurrence of the second trigger under the condition in which the first trigger occurs, the transition process or the notification process may not be performed even if the second trigger occurs under the condition that the first trigger does not occur.

3.2 Combination of Transition Process and Notification Process

In the description described above, the example of performing the transition process to the power saving mode and the example of performing the notification process for prompting transition to the power saving mode have been described. These processes are not limited to the matters that either one of the processes is performed.

For example, the power saving mode includes a first power saving mode and a second power saving mode different from the first power saving mode. Then, when it is determined that the degree of change in the list information is equal to or greater than the threshold value, or when the number of SSIDs included in the list information is continuously 0, the processing unit 110 performs the transition process to the first power saving mode, and performs the notification process for prompting transition to the second power saving mode. The first power saving mode is, for example, an operation mode in which the time interval for executing the scanning process is made longer than in the normal operation mode, and the second power saving mode is an operation mode in which the Wi-Fi function is turned off.

In this way, the electronic device 100 can automatically prompt the user to transition to the power saving mode while automatically transitioning to the power saving mode. More specifically, even when there is no explicit operation by the user, it becomes possible to realize a reduction in power consumption to a certain extent, and to further increase the reduction effect of power consumption when an instruction from the user is received.

The first power saving mode may be a mode in which a reduction amount in power consumption is small and return to the normal operation mode is easy, and the second power saving mode may be a mode in which the reduction amount in power consumption is large and it takes time to return to the normal operation mode. In this way, it is possible to use an appropriate power saving mode according to the presence or absence of a transition instruction from the user.

However, the first power saving mode and the second power saving mode may be different operation modes, and various modifications can be made to the specific contents. For example, the first power saving mode may be an operation mode in which the Wi-Fi function is limited, and the second power saving mode may be an operation mode in which the function of the display unit is limited.

3.3 Program and the Like

Each unit of the electronic device 100 of this embodiment may be realized as a module of a program running on a processor. For example, the program includes a communication control module for acquiring list information of SSIDs by the scanning process using a communication interface, and a processing module that performs at least one of a transition process to the power saving mode and a notification process for prompting transition to the power saving mode when it is determined that the degree of change in the list information is equal to or greater than the threshold value.

The program for realizing the process performed by each unit of the electronic device 100 according to this embodiment can be stored, for example, in an information storage medium which is a computer-readable medium. The information storage medium can be realized by, for example, an optical disk, a memory card, a hard disk drive (HDD), or a semiconductor memory. The semiconductor memory is, for example, a read only memory (ROM). The processing unit 110 performs various processes of this embodiment based on a program and data stored in the information storage medium. That is, a program for causing a computer to function as each unit of the electronic device 100 of this embodiment is stored in the information storage medium.

The computer is an apparatus including an input device, a processing unit, a storage unit, and an output unit. The program is a program for causing a computer to execute processing of each unit. The program is recorded on the information storage medium.

The method of this embodiment can be applied to a control method of the electronic device 100 and an operation method of the electronic device 100 which execute part or all of the steps illustrated in FIGS. 8 and 9. The control method according to this embodiment acquires the list information of the SSID by the scanning process, determines the degree of change of the list information, and performs at least one of a transition process to the power saving mode and a notification process for prompting transition to the power saving mode when it is determined that the degree of change is equal to or greater than the threshold value.

The electronic device of this embodiment includes a communication unit that acquires list information of SSIDs by a scanning process, and a processing unit that controls the communication unit. The processing unit performs at least one of a transition process to a power saving mode and a notification process for prompting transition to the power saving mode when it is determined that a degree of change of list information is equal to or greater than a threshold value.

According to the method of this embodiment, when the degree of change of the list information is large, that is, when the probability that the electronic device is transported is high, at least one of the transition process and the notification process may be executed. With this configuration, it is possible to appropriately reduce power consumption of the electronic device without impairing the convenience of the user.

In this embodiment, the processing unit may obtain the degree of change of the list information based on a comparison process between an SSID included in first list information acquired at a first timing and an SSID included in second list information acquired at a second timing.

In this way, the degree of change in the list information can be determined by the comparison process of a plurality of pieces of list information having different acquisition timings.

In this embodiment, when it is determined that the degree of change in the list information is less than the threshold value and when at least one of the number of SSIDs stored in the first list information and the number of SSIDs stored in the second list information is not 0, the processor performs a process for setting the normal operation mode. When both the number of SSIDs stored in the first list information and the number of SSIDs stored in the second list information are 0, the processor performs the transition process or the notification process.

In this way, it is possible to determine the operation mode of the electronic device based on both viewpoints of whether the degree of change in the list information is large and whether an access point exists around the electronic device.

In this embodiment, when the transition process is performed, the processor may perform a process of making a time interval for executing the scanning process longer than a given value.

In this way, it is possible to appropriately reduce power consumption due to the scanning process.

In this embodiment, when the transition process is performed, the processor may perform a display off process for turning off a display unit of the electronic device or a frequency reduction process of reducing a frequency of an operation clock.

In this case, power consumption of the electronic device can be reduced by control of the display unit or control of the operation clock.

In this embodiment, the communication unit performs communication according to a first wireless communication scheme used for the scanning process and communication according to a second wireless communication scheme different from the first wireless communication scheme. The processor may perform a process for causing the communication unit to transmit a beacon signal conforming to the second wireless communication scheme including information for prompting transition to the power saving mode, when the notification process is performed.

In this way, it is possible to execute the notification process using a wireless communication scheme different from the wireless communication scheme used for the scanning process. For that reason, for example, it is possible to transmit information using an aspect having high probability that peripheral terminal devices can receive.

In this embodiment, the communication unit performs communication according to the first wireless communication scheme used for the scanning process and communication according to the second wireless communication scheme different from the first wireless communication scheme. The processor performs the notification process for causing the communication unit to transmit the beacon signal conforming to the second wireless communication scheme including information for prompting transition to the power saving mode when it is determined that the number of occurrences or occurrence time of an event in which the degree of change is determined to be equal to or greater than the threshold value or an event in which both the number of the SSIDs stored in the first list information and the number of SSIDs stored in the second list information are 0 satisfies a given condition.

In this way, execution frequency of the notification process is suppressed, and thus the convenience of the user can be prevented from being impaired.

In this embodiment, the beacon signal may include information indicating that the electronic device is moving, or information indicating that an access point does not exist around the electronic device.

In this way, it is possible to appropriately notify the device which receives the beacon signal that the electronic device is in a state to transition to the power saving mode.

In this embodiment, the processor may perform a process of turning off a communication operation of the communication unit according to the first wireless communication scheme when an instruction to transition to the power saving mode is received within a given wait time after transmitting the beacon signal.

In this way, it is possible to appropriately receive the transition instruction that is triggered by transmission of the beacon signal and to transition to the power saving mode in which power consumption by the communication unit is reduced.

In the embodiment, the electronic device may include a print unit that prints an image on a print medium.

In this way, it is possible to appropriately reduce power consumption of the electronic device which is a printing device.

In this embodiment, the electronic device may include an image reading unit that reads an image by an image sensor.

In this way, it is possible to appropriately reduce power consumption of the electronic device which is a scanner.

The program of this embodiment causes a computer to function as a processing unit that controls a communication unit that acquires list information of SSIDs by a scanning process. Then, when it is determined that the degree of change in the list information is equal to or greater than a threshold value, the processing unit performs at least one of a transition process to a power saving mode and a notification process for prompting transition to the power saving mode.

In a control method of the electronic device according to this embodiment, when list information of an SSID is acquired by a scanning process, a degree of change of the list information is determined, and it is determined that the degree of change is equal to or greater than the threshold value, at least one of a transition process to the power saving mode and a notification process for prompting transition to the power saving mode is performed.

Although this embodiment has been described in detail as described above, it will be readily understood by those skilled in the art that many modifications can be made without departing substantially from novelties and effects of the present disclosure. Accordingly, all such modification examples are intended to be included within the scope of the present disclosure. For example, in the specification or the drawings, the terms described at least once, together with the broader or synonymous different terms, can be replaced with the different terms anywhere in the specification or the drawings. All combinations of the present embodiment and the modification examples are also included in the scope of the present disclosure. The configuration and operation of the electronic device, the terminal device, and the like are not limited to those described in the present embodiment, and various modifications can be made.

What is claimed is:

1. An electronic device comprising:
a communication unit that performs wireless communication with an external terminal, wherein the communication unit performs communication according to a first wireless communication scheme used for a scanning process and communication according to a second wireless communication scheme different from the first wireless communication scheme; and
a processor that performs mode switching between a normal mode and a power saving mode, wherein
the processor performs at least one of a transition process to the power saving mode and a notification process for prompting a user to transit to the power saving mode, in accordance with a determination that a degree of change of the external terminal configured to perform wireless communication is equal to or greater than a threshold value in the normal mode, wherein the processor further obtains the degree of change based on a comparison process of a first service set identifier (SSID) acquired at a first timing and a second SSID acquired at a second timing,
wherein the processor performs the notification process for causing the communication unit to transmit a beacon signal conforming to the second wireless communication scheme including information for prompting transition to the power saving mode when it is determined that the number of occurrences or occurrence time of an event in which the degree of change is determined to be equal to or greater than the threshold value or an event in which both the number of the first SSIDs and the number of the second SSIDs are 0 satisfies a given condition.

2. The electronic device according to claim 1, wherein the processor performs a process for setting the electronic device to the normal mode when it is determined that the degree of change is less than the threshold value and when at least one of a number of service set identifiers included in a first SSID list information and a number of service set identifiers included in a second SSID list information is not 0, and performs the transition process or the notification process when both the number of the SSIDs included in the first SSID list information and the number of the SSIDs included in the second SSID list information are 0.

3. The electronic device according to claim 1, wherein when the transition process is performed, the processor performs a process of making a time interval for executing the scanning process longer than a given value.

4. The electronic device according to claim 1, wherein when the transition process is performed, the processor performs at least one of a display off process for turning off a display unit of the electronic device, a frequency reduction process of reducing a frequency of an operation clock, and stopping radio waves of a predetermined frequency band.

5. The electronic device according to claim 1, wherein the communication unit performs communication according to the first wireless communication scheme used for the scanning process and communication according to the second wireless communication scheme different from the first wireless communication scheme, and the processor performs a process for causing the communication unit to transmit the beacon signal conforming to the second wireless communication scheme including information for prompting transition to the power saving mode when the notification process is performed.

6. The electronic device according to claim 5, wherein the beacon signal includes information indicating that the electronic device is moving, or information indicating that an access point does not exist around the electronic device.

7. The electronic device according to claim 5, wherein when an instruction of transition to the power saving mode is received within a given wait time after transmitting the beacon signal, the processor performs a process of turning off a communication operation of the communication unit according to the first wireless communication scheme.

8. The electronic device according to claim 1, further comprising:
a print unit that prints an image on a print medium.

9. The electronic device according to claim 1, further comprising:
an image reading unit that reads an image by an image sensor.

10. A non-transitory computer-readable storage medium storing a computer-executable program, the program being structured such that, when executed by a computer performing wireless communication with an external terminal, the program causing the computer to perform the following:
performing wireless communication with an external terminal using a communication unit, wherein the communication unit performs communication according to a first wireless communication scheme used for a scanning process and communication according to a second wireless communication scheme different from the first wireless communication scheme; and
performing, by a processor, mode switching between a normal mode and a power saving mode, wherein
the processor performs at least one of a transition process to the power saving mode and a notification process for prompting a user to transit to the power saving mode, in accordance with a determination that a degree of change of the external terminal configured to perform wireless communication is equal to or greater than a threshold value in the normal mode, wherein the processor further obtains the degree of change based on a comparison process of a first service set identifier (SSID) acquired at a first timing and a second SSID acquired at a second timing, wherein the processor performs the notification process for causing the communication unit to transmit a beacon signal conforming to the second wireless communication scheme including information for prompting transition to the power saving mode when it is determined that the number of occurrences or occurrence time of an event in which the degree of change is determined to be equal to or greater than the threshold value or an event in which both the number of the first SSIDs and the number of the second SSIDs are 0 satisfies a given condition.

* * * * *